(12) United States Patent
Qi et al.

(10) Patent No.: US 10,637,862 B2
(45) Date of Patent: Apr. 28, 2020

(54) PRIVACY SETTING METHOD, APPARATUS, AND SYSTEM

(71) Applicant: TENCENT TECHNOLOGY (SHENZHEN) COMPANY LIMITED, Shenzhen, Guangdong (CN)

(72) Inventors: Ying Qi, Shenzhen (CN); Bin Liu, Shenzhen (CN); Wei Luo, Shenzhen (CN); Beiqi Wu, Shenzhen (CN); Yuxuan Zhang, Shenzhen (CN); Zongzhuo Wu, Shenzhen (CN); Rui Guo, Shenzhen (CN); Haochuan Cui, Shenzhen (CN); Duokai Huang, Shenzhen (CN); Zhenan Guan, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 278 days.

(21) Appl. No.: 15/292,973

(22) Filed: Oct. 13, 2016

(65) Prior Publication Data
US 2017/0034176 A1 Feb. 2, 2017

Related U.S. Application Data

(63) Continuation of application No. PCT/CN2015/070201, filed on Jan. 6, 2015.

(30) Foreign Application Priority Data

Apr. 30, 2014 (CN) .......................... 2014 1 0182127

(51) Int. Cl.
*H04L 29/06* (2006.01)
*H04W 4/21* (2018.01)
(Continued)

(52) U.S. Cl.
CPC ............ *H04L 63/10* (2013.01); *G06K 7/1413* (2013.01); *G06K 19/06028* (2013.01);
(Continued)

(58) Field of Classification Search
None
See application file for complete search history.

(56) References Cited

U.S. PATENT DOCUMENTS

| 2006/0143066 A1* | 6/2006 | Calabria | ............ G06Q 30/0201 |
| | | | 705/7.29 |
| 2007/0078938 A1 | 4/2007 | Hu et al. | |

(Continued)

FOREIGN PATENT DOCUMENTS

| CN | 1878207 A | 12/2006 |
| CN | 101193073 A | 6/2008 |

(Continued)

OTHER PUBLICATIONS

International Search Report to PCT International Application No. PCT/CN2015/070201, dated Apr. 17, 2015 (3p).

(Continued)

*Primary Examiner* — William J. Goodchild
(74) *Attorney, Agent, or Firm* — Morgan, Lewis & Bockius LLP

(57) ABSTRACT

Method and device for configuring privacy settings for a social network application are disclosed. The method is performed at a first user device, and includes: receiving a relationship establishment instruction from a first user of the first user device, the relationship establishment instruction being associated with a first relationship establishment mode used by the first user for establishing a relationship; in accordance with the first relationship establishment mode, selecting a respective privacy setting for use by the first user; executing the relationship establishment instruction to establish the relationship between the first user and the second user in the first social network; and after executing the relationship establishment instruction resulting in establishing the relationship between the first user and second user, granting a permission for social network interactions (Continued)

between the first user and the second user in accordance with the respective privacy setting.

20 Claims, 18 Drawing Sheets

(51) Int. Cl.
    *H04L 29/08*     (2006.01)
    *G06Q 50/00*     (2012.01)
    *G06Q 30/00*     (2012.01)
    *G06K 7/14*     (2006.01)
    *G06K 19/06*     (2006.01)

(52) U.S. Cl.
    CPC ............ *G06Q 30/01* (2013.01); *G06Q 50/01* (2013.01); *H04L 29/08* (2013.01); *H04L 67/306* (2013.01); *H04W 4/21* (2018.02)

(56) References Cited

U.S. PATENT DOCUMENTS

| | | | |
|---|---|---|---|
| 2007/0192299 A1* | 8/2007 | Zuckerberg | G06Q 10/10 |
| 2008/0046976 A1* | 2/2008 | Zuckerberg | H04L 63/102 726/4 |
| 2011/0083101 A1* | 4/2011 | Sharon | H04W 4/21 715/800 |
| 2011/0159884 A1* | 6/2011 | Chawla | H04W 52/0254 455/456.1 |
| 2012/0323647 A1* | 12/2012 | Klooster | G06Q 30/02 705/14.1 |
| 2013/0066963 A1* | 3/2013 | Odio | G06Q 10/10 709/204 |
| 2013/0291058 A1* | 10/2013 | Wollenstein | H04L 63/20 726/1 |

FOREIGN PATENT DOCUMENTS

| | | |
|---|---|---|
| CN | 102253952 A | 11/2011 |
| CN | 102404335 A | 4/2012 |
| CN | 103379438 A | 10/2013 |
| CN | 103441922 A | 12/2013 |

OTHER PUBLICATIONS

Office Action dated Sep. 30, 2017 for Chinese Application No. 201410182127.X, 6 pages.

* cited by examiner

PRIVACY SETTING METHOD, APPARATUS, AND SYSTEM

PRIORITY CLAIM AND RELATED APPLICATION

This application is a continuation of International Application No. PCT/CN2015/070201, filed on Jan. 6, 2015, claims priority to Chinese Patent Application No. 201410182127.X, titled "RIGHTS SETTING METHOD, APPARATUS, AND SYSTEM" filed on Apr. 30, 2014, which are incorporated by reference in their entireties.

TECHNICAL FIELD

The present disclosure relates to the field of mobile communications technologies, and in particular, to a privacy setting method, apparatus, and system.

BACKGROUND

Social networks enable users to share their personal information to their social contacts of various relationships. Some social network applications allow users to select their privacy settings for different contacts so that users can manage the scope and depth of interactions with different people. However, when a user has many contacts in a social network, managing privacy settings for every contact becomes very burdensome. Therefore, it is desirable to have a method that provides automatic privacy setting for every contact.

SUMMARY

In accordance with some implementations of the disclosed technology, a method of configuring privacy settings for a social network application is disclosed. The method is performed at a first user device (e.g., client device 104, FIGS. 1 and 3). The method includes: receiving a relationship establishment instruction from a first user of the first user device, the relationship establishment instruction being associated with a first relationship establishment mode used by the first user for establishing a relationship between the first user and a second user in a first social network; in accordance with the first relationship establishment mode, selecting a respective privacy setting for use by the first user with respect to the second user from a plurality of privacy settings each corresponding to one or more respective relationship establishment modes; executing the relationship establishment instruction to establish the relationship between the first user and the second user in the first social network; and after executing the relationship establishment instruction resulting in establishing the relationship between the first user and second user, granting a permission for social network interactions between the first user and the second user in accordance with the respective privacy setting.

In another aspect, a device (e.g., client device 104, FIGS. 1 and 3) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device (e.g., client device 104, FIGS. 1 and 3) to perform the method described above.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

To describe the technical solutions in the embodiments more clearly, the following briefly introduces the accompanying drawings required for describing the embodiments. Apparently, the accompanying drawings in the following descriptions show merely some embodiments, and a person of ordinary skill in the art may still derive other drawings from the accompanying drawings without creative efforts.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application clearer, the following further describes the present application in details with reference to the accompanying drawings. Apparently, the described embodiments are merely some embodiments, rather than all embodiments. All other embodiments obtained by a person of ordinary skill in the art without creative efforts and according to the embodiments shall fall within the protection scope of the present application.

Figure 1:
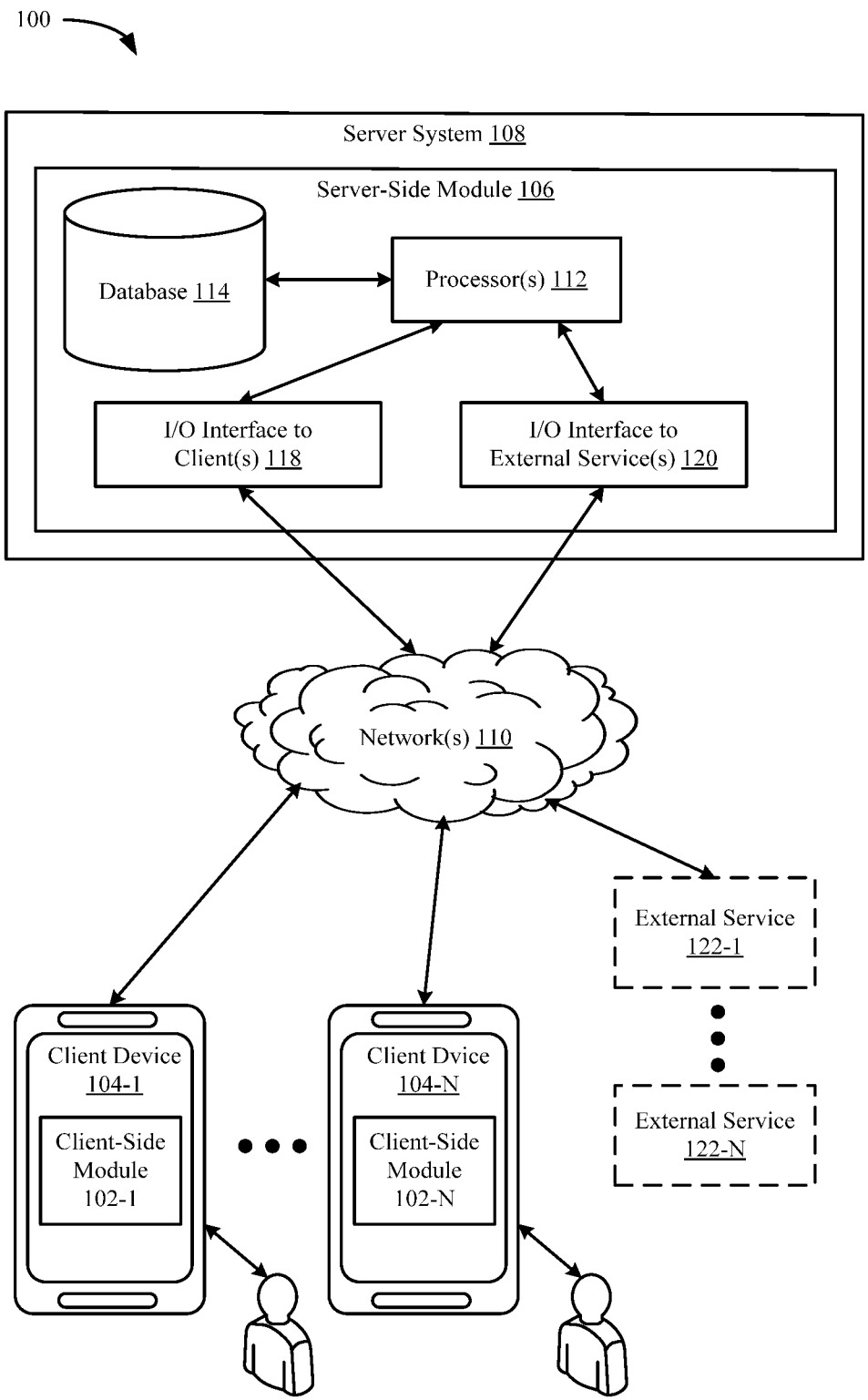
FIG. 1 is a block diagram of a server-client environment in accordance with some embodiments.

As shown in FIG. 1, configuring privacy settings is implemented in a server-client environment 100 in accordance with some embodiments. In some embodiments, server-client environment 100 includes client-side processing 102-1 ... 102-N (hereinafter "client-side module 102") executed on a client device 104-1 ... 104-N, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, and social networking services) and communications with server-side module 106. Server-side module 106 provides server-side functionalities for the social networking platform (e.g., instant messaging, and social networking services) for any number of client modules 102 each residing on a respective client device 104.

In some embodiments, server-side module 106 includes one or more processors 112, one or more databases 114, an I/O interface to one or more clients 118, and an I/O interface to one or more external services 120. I/O interface to one or more clients 118 facilitates the processing of input and output associated with the client devices for server-side module 106. One or more processors 112 obtain instant messages from a plurality of users, process the instant messages, process location information of a client device, and share location information of the client device to client-side modules 102 of one or more client devices. The database 114 stores various information, including but not limited to, map information, service categories, service provider names, and the corresponding locations. The database 114 may also store a plurality of record entries relevant to the users associated with privacy setting, and the information exchanged among the users for privacy setting. I/O interface to one or more external services 120 facilitates communications with one or more external services 122 (e.g., merchant websites, credit card companies, and/or other processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
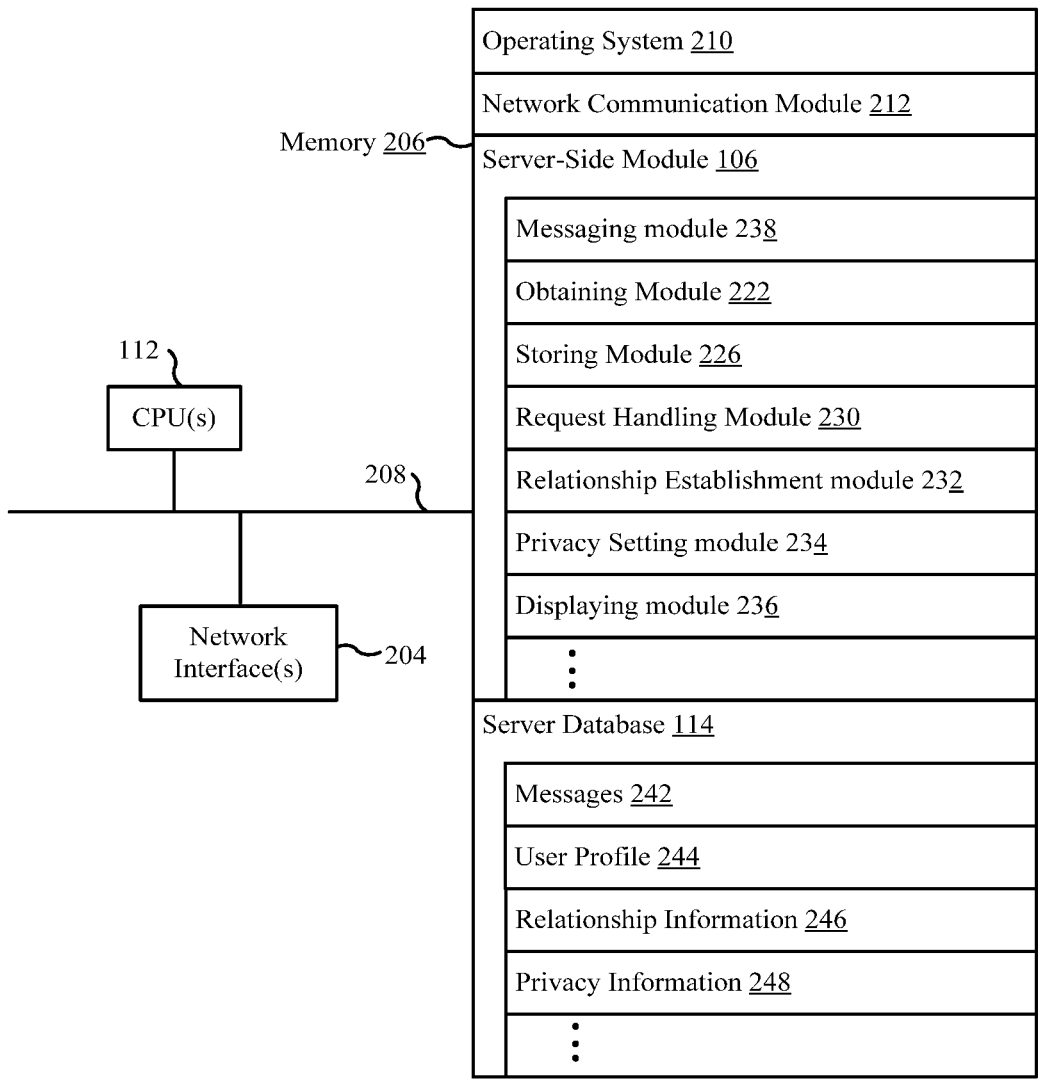
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing for the social networking platform (e.g., location information processing and sharing, instant messaging, and social networking services), includes, but is not limited to:
  messaging module 238 for processing and routing instant messages exchanged among a first user and one or more second users of a social networking platform;
  obtaining module 222 for obtaining location information of the first user from a client device 104 associated with the first user;
  storing module 226 for storing various information in the database 114, the various information including map information, service categories, server provider names, user locations, and entries relevant to the instant messages exchanged during a chat session;
  request handling module 230 for handling and responding to various requests sent from client devices of the social networking platform;
  relationship establishment module 232 for establishing and managing relationships for user accounts, including receiving and forwarding relationship establishment invitations and confirmations;
  privacy setting module 234 for processing privacy information of the user, including receiving privacy setting information from users; and
  displaying module 236 for displaying information of one user to another user in accordance with privacy settings of users; and
one or more server database 114 storing data for the social networking platform, including but not limited to:
  messages 242 storing messages exchanged among a plurality of users;
  user profiles 244 storing user profiles for the plurality of users, wherein a respective user profile for a user may include a user/account name or handle, login credentials to the social networking platform, location information of the user, payment data (e.g., linked credit card information, app credit or gift card balance, billing address, shipping address, etc.), custom parameters (e.g., age, location, hobbies, etc.) for the user, social network contacts, groups of contacts to which the user belongs, information and content shared on sharing platforms and identified trends and/or likes/dislikes of the user;
  relationship information 246 storing relationships among users, including grouping of contacts by every user; and
  privacy information 248 storing privacy setting of each user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
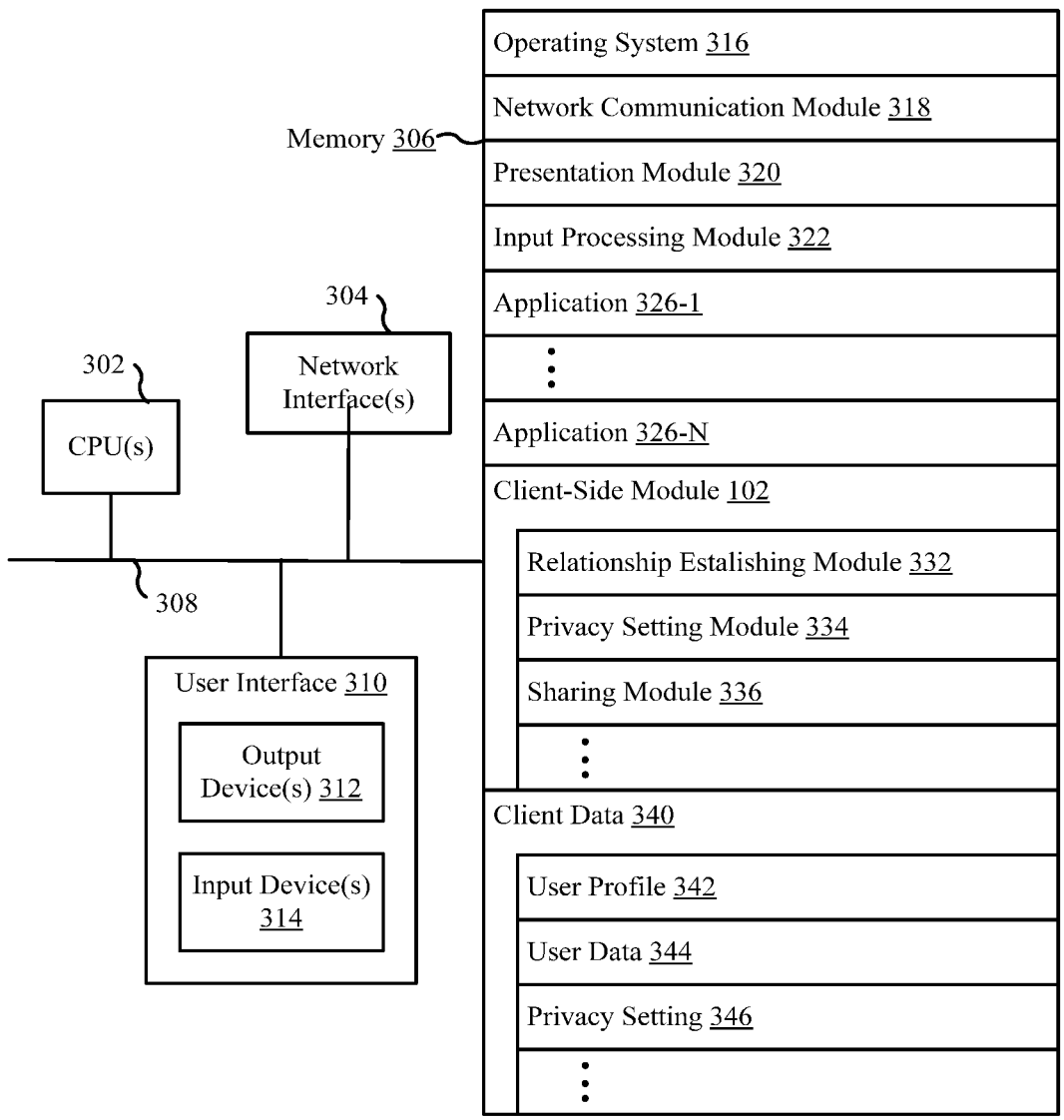
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
  operating system 316 including procedures for handling various basic system services and for performing hardware dependent tasks;
  network communication module 318 for connecting client device 104 to other computing devices (e.g., server system 108 and external service(s) 122) connected to one or more networks 110 via one or more network interfaces 304 (wired or wireless);
  presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;
  input processing module 322 for detecting one or more user inputs or interactions from one of the one or more input devices 314 and interpreting the detected input or interaction;
  one or more applications 326-1-326-N for execution by client device 104 (e.g., games, application marketplaces, payment platforms, social network platforms, and/or other applications); and
  client-side module 102, which provides client-side data processing and functionalities for privacy setting, including but not limited to:
    relationship establishing module 332 for sending and receiving relationship establishment invitations and confirmations;
    privacy setting module 334 for selecting privacy settings in accordance with relationship establishment modes and user instructions; and
    sharing module system 336 for sending content shared by the user in the sharing platform to the server system (e.g., server system 108) for sharing among one or more users; and
  client data 340 storing data of a user associated with the client device, including, but is not limited to:

user profile 342 storing a user profile associated with the user of client device 104 including a user/account name or handle, login credentials for privacy setting, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;

user data 344 storing data authored, saved, liked, or chosen as favorites by the user of client device 104 in a social networking platform; and privacy setting 346 storing privacy settings towards all contacts of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
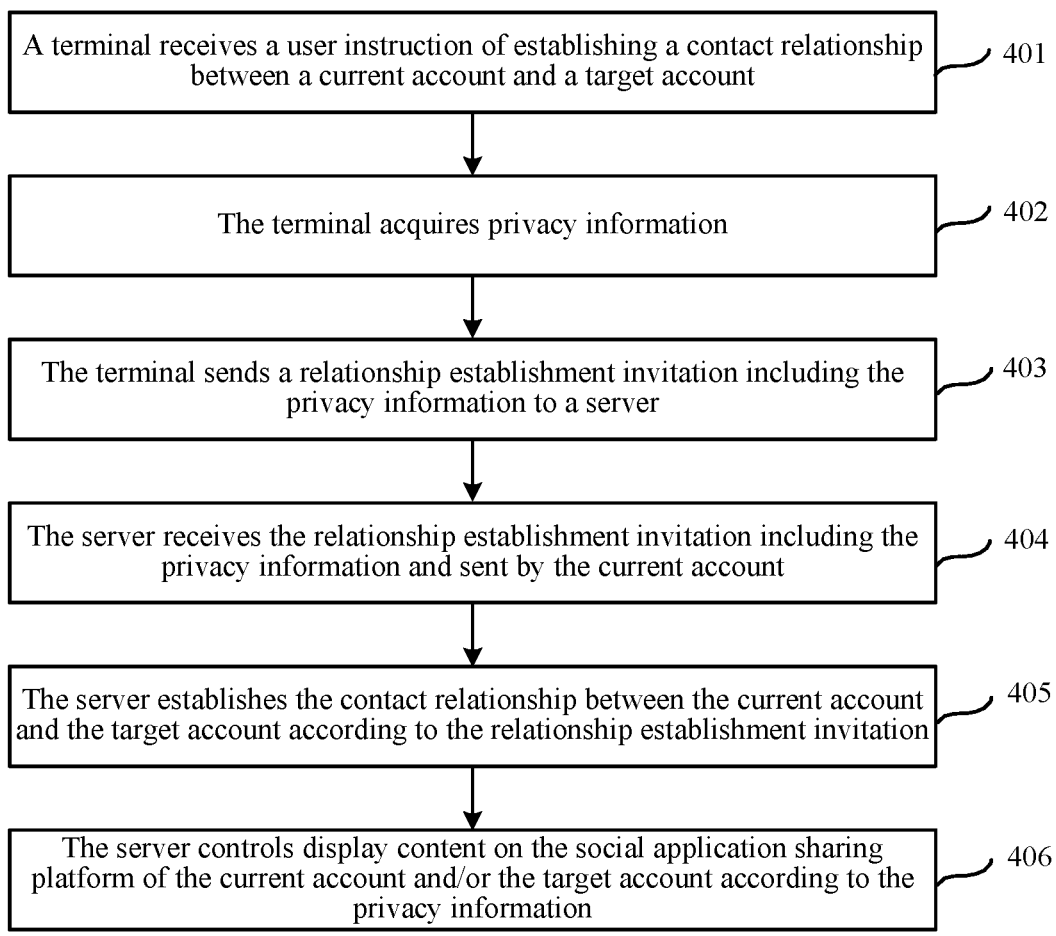
FIG. 4A is a flowchart of a privacy setting method in accordance with some embodiments.

FIG. 4A shows a flowchart of a privacy setting method in accordance with some embodiments. The privacy setting method includes:

Step 401: A terminal (e.g., a first user device) receives a user instruction of establishing a relationship between a current account (e.g., the user account currently active on the first user device) and a target account (e.g., the user account of another user with whom the first user wishes to interact on a social network).

In accordance with some embodiments, when a user requests that the target account be added as a contact of the current account, the terminal receives a user instruction of applying to add the target account as a contact. When the user needs to determine whether to agree to a relationship establishment invitation of the target account, the terminal receives a relationship establishment invitation sent by the server and indicates that the target account applies to add a contact.

Step 402: The terminal acquires privacy information.

In accordance with some embodiments, the privacy information includes a sharing permission of the target account to view information on a sharing platform, or a display permission to display information of the target account in a page displayed to the current account, or includes a combination of the foregoing two permissions.

Figure 4B:
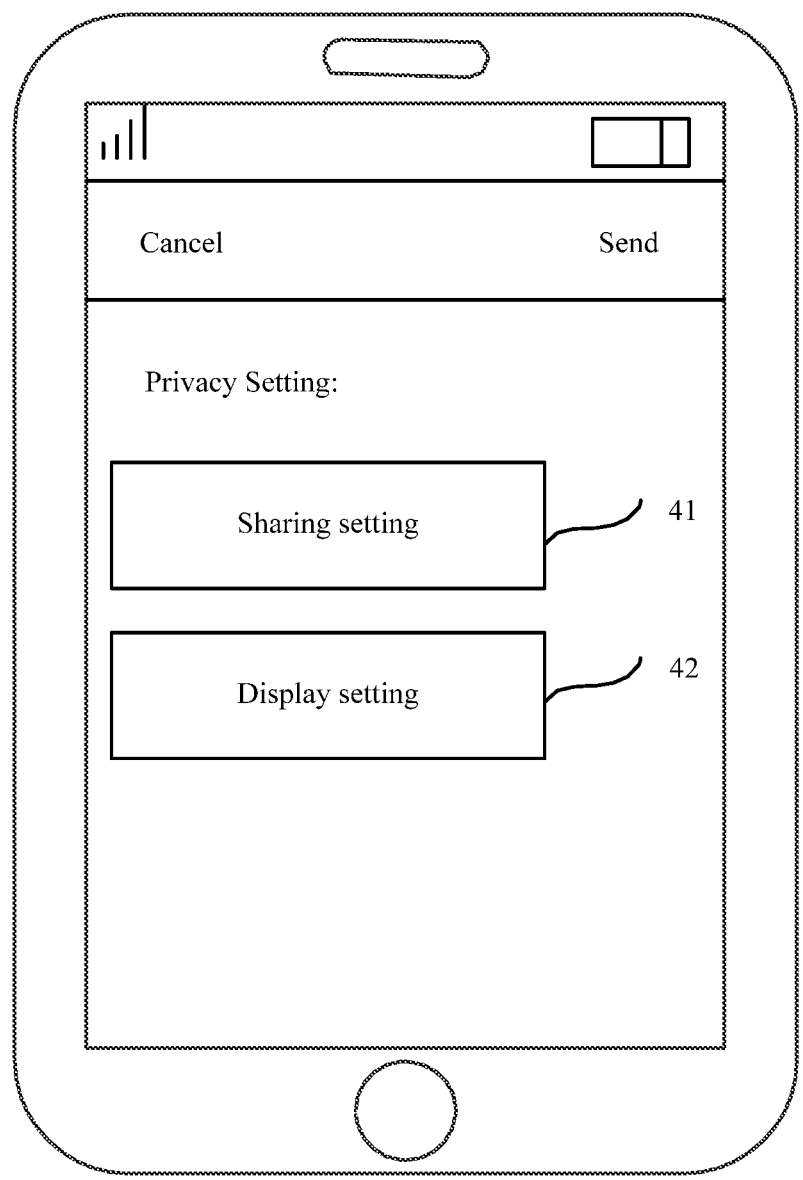
FIG. 4B is a schematic display diagram of a terminal when a user sets privacy information in accordance with some embodiments.

Specifically, after receiving the user instruction, the terminal displays a display interface that includes sharing setting 41 and display setting 42, as shown in FIG. 4B. In some embodiments, the user can set the privacy information by using the privacy setting options on the display interface.

In some embodiments, setting the sharing permission in the privacy information includes the following steps.

First, the terminal displays a first interface including sharing options. When the user needs to set the sharing permission, the user may select the sharing options in FIG. 4B; after receiving the selection, the terminal displays the first interface including the sharing option.

For example, the sharing options includes at least one of the following permissions:

allowing the target account to view all information of the current account on the sharing platform;

allowing the target account to view status information shared by the current account on the sharing platform;

allowing the target account to view an album shared by the current account on the sharing platform;

allowing the target account to view information shared by the current account on the sharing platform; and not allowing the target account to view any information shared by the current account on the sharing platform.

During actual implementation, after receiving the selection, the terminal is redirected from the interface shown in FIG. 4B to the first interface including the sharing options. For example, when the sharing options include three or more of the foregoing sharing permissions at the same time, the terminal is redirected to the first interface shown in FIG. 4C; and when the sharing option only includes two sharing permissions, the terminal is redirected to the first interface shown in FIG. 4D.

Figure 4C:
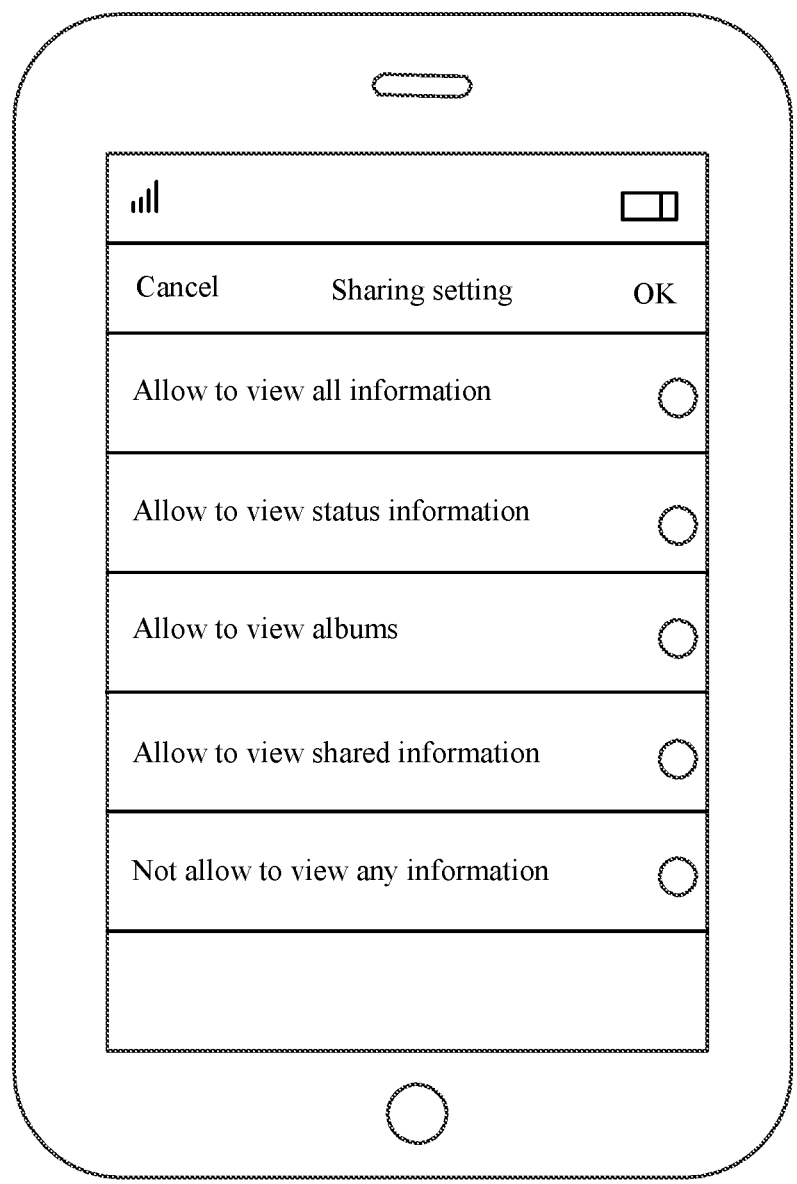
FIG. 4C is a schematic display diagram when a terminal acquires privacy information in accordance with some embodiments.
Figure 4D:
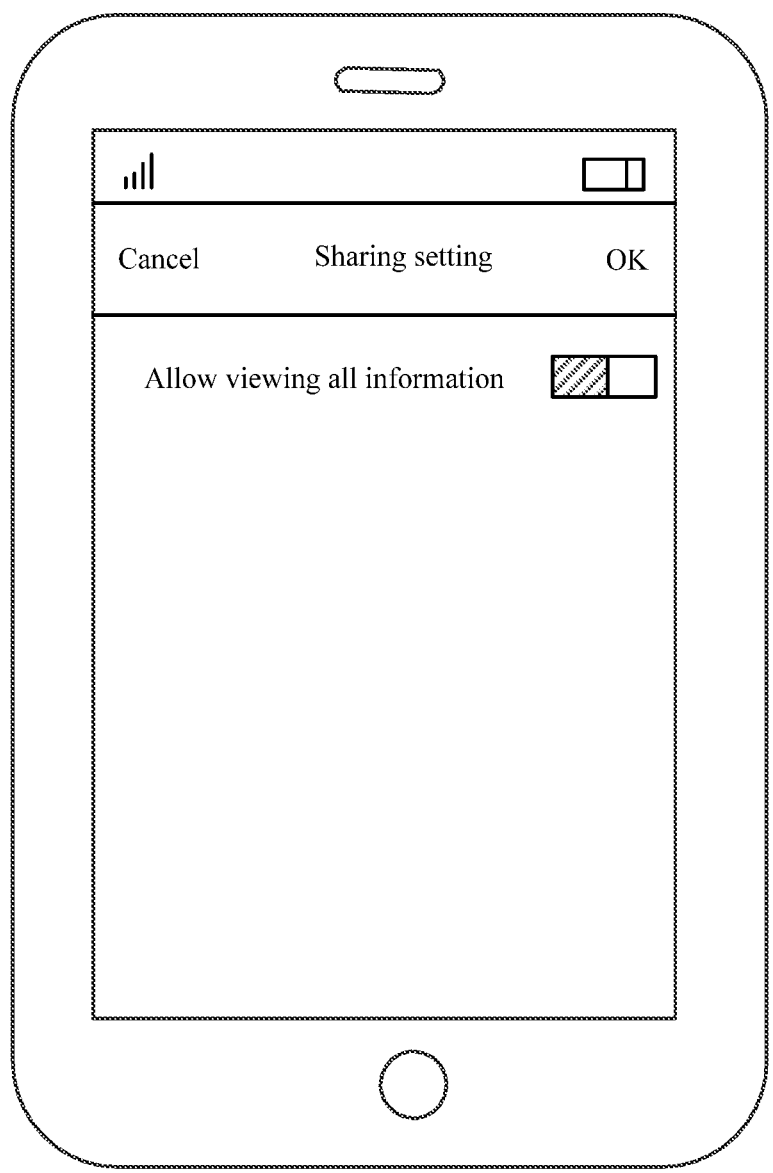
FIG. 4D is a schematic display diagram when a terminal acquires privacy information in accordance with some embodiments.
Figure 4E:
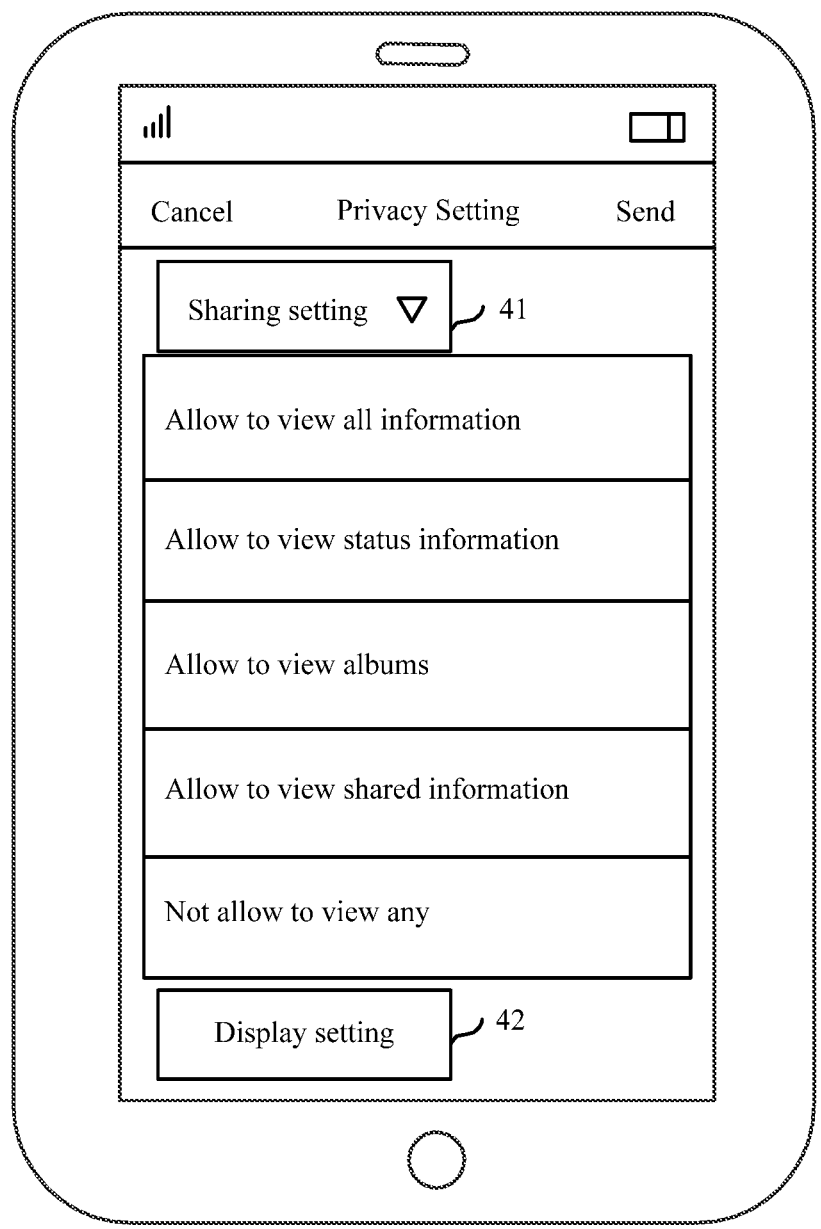
FIG. 4E is s a schematic display diagram when a terminal acquires privacy information in accordance with some embodiments.

It should be noted that, when the display interface shown in FIG. 4B includes a sharing option that can be expanded, the user may choose to expand the sharing option, and after the sharing option is expanded, the terminal uses the interface as the first interface, for example, the terminal displays the first interface shown in FIG. 4E.

Secondly, the terminal receives, on the first interface, a selection of at least one sharing permission from the sharing options.

After the terminal displays the first interface, the user may select, from the sharing options on the first interface. Accordingly, the terminal receives, on the first interface, a selection from the sharing options.

For example, when the terminal displays the first interface shown in FIG. 4C, the user may select two sharing permissions on the first interface at the same time, and accordingly, the terminal receives a selection of the foregoing two sharing permissions. When the terminal displays the first interface shown in FIG. 4D, the user may slide a slider on the first interface to select any permission.

Thirdly, the terminal uses the selected at least one sharing permission as the sharing permission of the target account.

Accordingly, the terminal sets the selected at least one sharing permission as the sharing permission of the target account.

Similar to the step of acquiring, by the terminal, the sharing permission, the step of acquiring the display permission in the privacy information may include:

First, display a second interface including display permission options.

The candidate display permission includes at least one of the following permissions:

displaying all information of the target account;

displaying status information of the target account;

displaying an album of the target account;

displaying information shared by the target account; and not displaying any information of the target account.

Secondly, receive, on the second interface, a selection of at least one display permission option from the candidate display permission.

Thirdly, use the selected at least one display permission as the display permission of the current account.

Step 403: The terminal sends a relationship establishment invitation including the privacy information to the server.

After acquiring the privacy information, the terminal sends the relationship establishment invitation including the privacy information to the server.

For example, after selecting the sharing permission on the first interface shown in FIG. 4C, the user clicks confirmation to add the sharing permission. After receiving a clicking of the user, the first terminal sends the relationship establishment invitation including the privacy information to the server.

Step 404: The server receives the relationship establishment invitation including the privacy information and sent by the current account.

Accordingly, the server receives the relationship establishment invitation including the privacy information corresponding to the current account.

The privacy information includes a sharing permission of the target account to view information shared by the current account on the sharing platform, or a display permission to display, shared by the current account on the sharing platform, information of the target account, or includes a combination of the foregoing two permissions.

Step 405: The server establishes the contact relationship between the current account and the target account according to the relationship establishment invitation.

Step 406: The server controls display content shared by the current account on the sharing platform and/or the target account according to the privacy information.

In accordance with some embodiments, after establishing the relationship between the current account and the target account, the server controls the display content on the social application sharing platform of at least one of the current account and the target account according to the privacy information. For example, when the privacy information is the sharing permission, and the sharing permission includes a permission of the target account to view status information shared by the current account on the sharing platform and a permission of the target account to view information shared by the current account on the sharing platform, the server acquires the status information shared by the current account on the sharing platform and information forwarded by the current account, and send the acquired information to the social application sharing platform of the target account, and then the social application sharing platform of the target account displays the received content.

It should be noted that, the current account may be an account requesting that the target account be added as a contact, or an account that the target account applies to add as a contact, and accordingly, the target account may be an account that the current account applies to add as a contact, or an account that applies to add the current account as a contact.

Figure 5A:
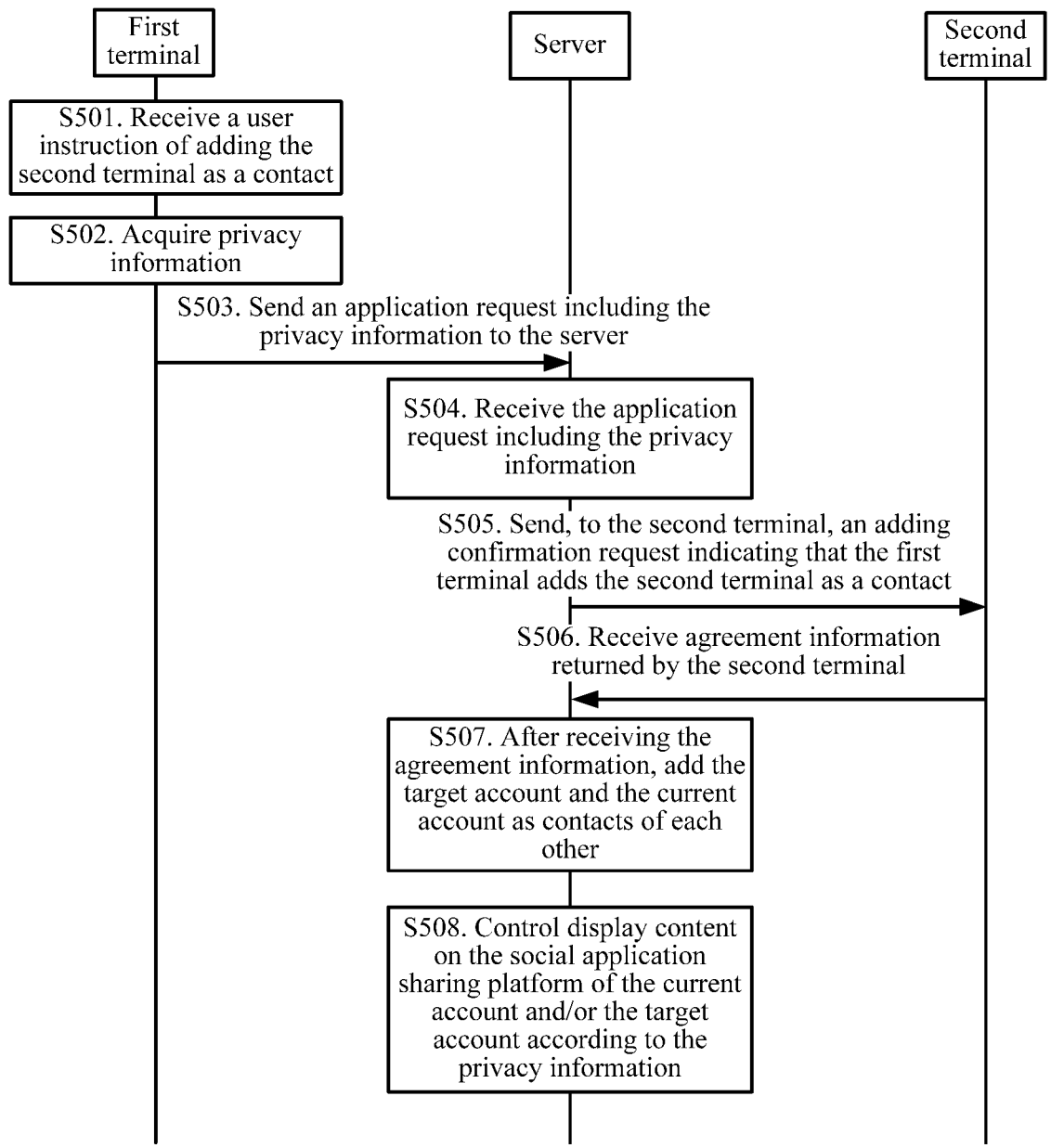
FIG. 5A is a flowchart of a privacy setting method in accordance with some embodiments.

FIG. 5A shows a flowchart of a privacy setting method in accordance with some embodiments. The privacy setting method includes the following steps.

Step 501: The first terminal receives a user instruction of adding the second terminal as a contact.

Figure 5B:
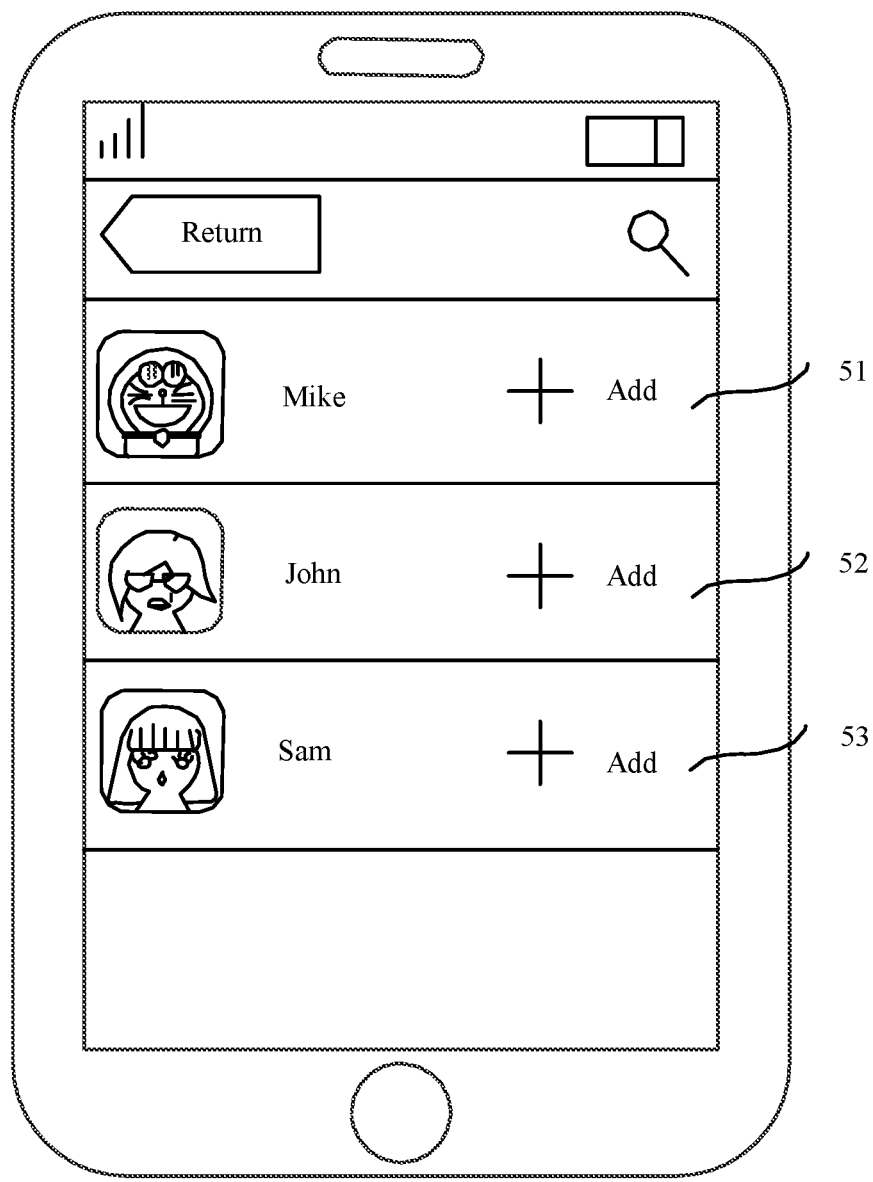
FIG. 5B is a schematic display diagram of a first terminal when the first terminal requests that a second terminal be added as a contact in accordance with some embodiments.

In a process of using a communication tool in the first terminal by a user, when the user needs to add the target account as a contact, the user gives a user instruction of adding the second terminal as a contact; and accordingly, the first terminal receives the user instruction of adding the second terminal as a contact. For example, as shown in FIG. 5B, when the user needs to add "Sam" as a contact, the user may click an "Add" button 53 corresponding to "Sam", and accordingly, the first terminal receives a user instruction of adding "Sam" as a contact.

The second terminal is obtained by the first terminal through account searching, a contact recommendation function, or determined by scanning a barcode of the second terminal.

Step 502: The first terminal acquires privacy information.

After receiving the user instruction, the first terminal acquires the privacy information in a way similar to the step 402 described above.

Figure 5C:
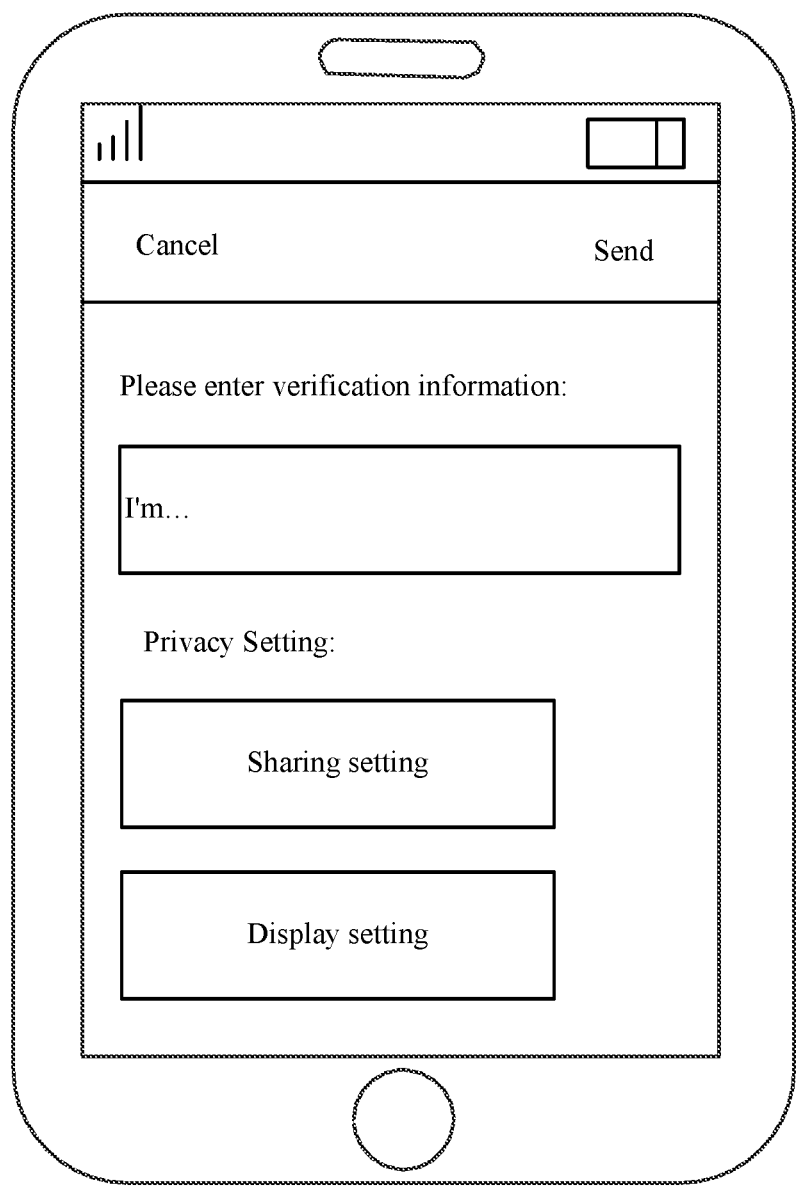
FIG. 5C is a schematic display diagram of a terminal when a user sets privacy information in accordance with some embodiments.

It should further be noted that, when the second terminal sets identity verification, and the first terminal needs to input verification information when requesting that the second terminal be added as a contact, e.g., in a first interface shown in FIG. 5C. For example, the terminal first displays an input interface including the verification information input box, and then display the first interface Step 503: The first terminal sends a relationship establishment invitation including the privacy information to a server.

After acquiring the privacy information, the first terminal sends the relationship establishment invitation including the privacy information to the server. In some embodiments, the relationship establishment invitation is a request for adding the second terminal as a contact.

Step 504: The server receives the relationship establishment invitation including the privacy information.

Step 505: The server sends, to the second terminal, an adding confirmation request indicating that the first terminal adds the second terminal as a contact.

After receiving the relationship establishment invitation, in order to inform the second terminal that another terminal has a request for being added as a contact, the server sends, to the second terminal, the adding confirmation request indicating that the first terminal adds the second terminal as a contact.

Step 506: The server receives agreement information returned by the second terminal.

After the second terminal receives the adding confirmation request, the user of the second terminal chooses to agree to be added or reject being added as a contact. When the user chooses to agree to be added as contact, the second terminal returns the agreement information to the server; when the user chooses to reject being added as a contact, the second terminal returns rejection information to the server. When the second terminal returns the agreement information to the server, the server accordingly receives the agreement information returned by the second terminal.

Step 507: After receiving the agreement information, the server adds the target account and the current account as contacts of each other.

Step 508: The server controls display content shared by the current account on the sharing platform and/or the target account according to the privacy information.

After establishing a relationship between the first terminal and the second terminal, the server control display content on the social application sharing platform of the first terminal or the second terminal, or on the social application sharing platforms of the two according to the privacy information in the received relationship establishment invitation.

To sum up, in the privacy setting method provided, before a relationship establishment invitation is sent, privacy information is acquired first. And then a relationship establishment invitation including the privacy information is sent to a server, so that after establishing a relationship between a current account and a target account, the server can immediately control display content on a social application sharing platform of the current account and/or the target account according to the privacy information in the relationship establishment invitation. Therefore, when receiving the relationship establishment invitation for establishing a relationship between two accounts, the server can acquire the privacy information from the relationship establishment invitation, thereby controlling the display content shared by the current account on the sharing platform and/or the target account according to the privacy information immediately after the contact relationship between the two accounts is established.

Figure 5D:
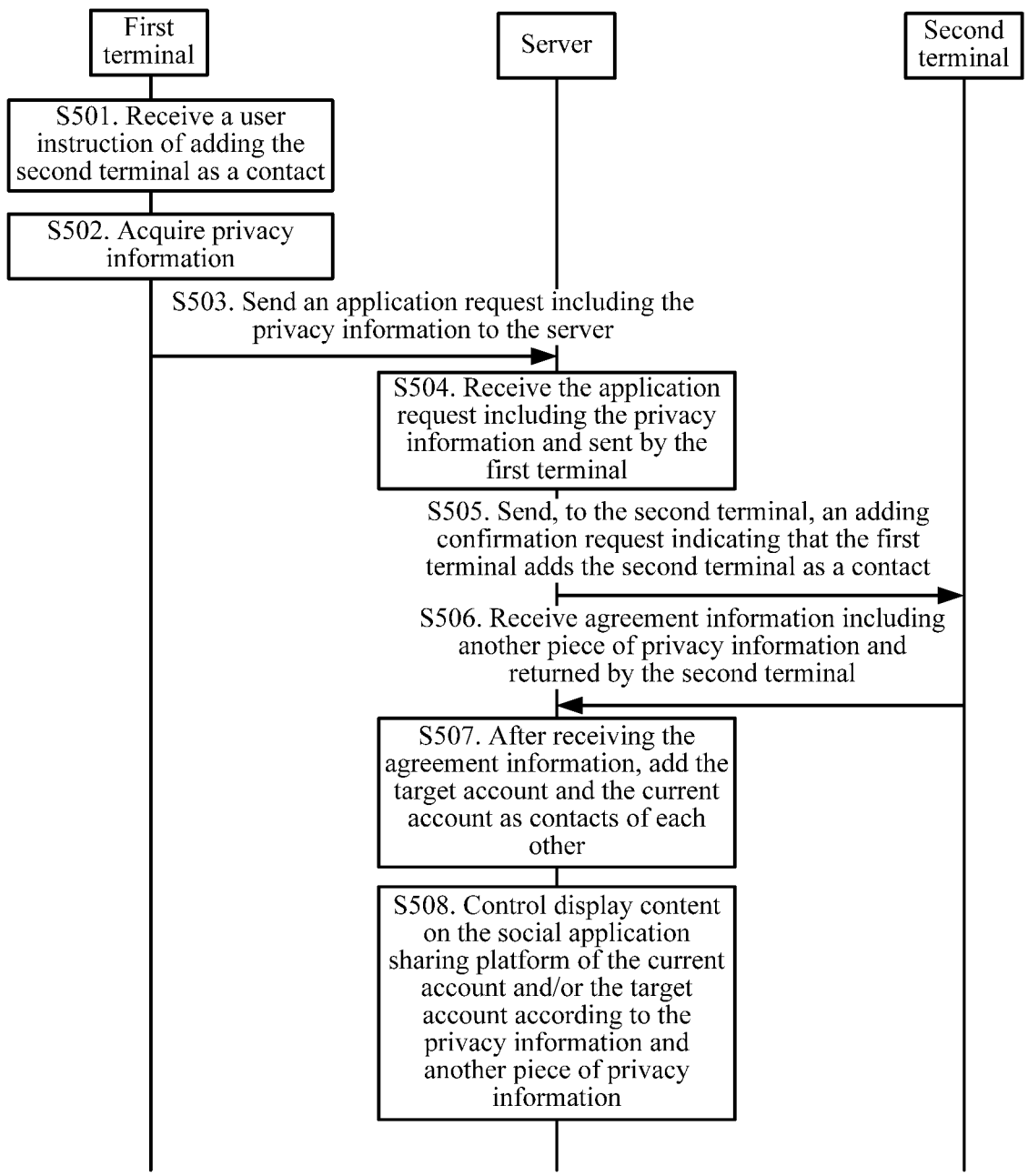
FIG. 5D is a flowchart of the privacy setting method in accordance with some embodiments.

It should be noted that, after the second terminal receives the adding confirmation request sent by the server, and when the second terminal confirms that the second terminal agrees to be added as a contact, the second terminal also acquires another piece of privacy information, and when returning the agreement information, the second terminal returns the agreement information including another piece of privacy information to the server. The other piece of privacy information includes a sharing permission of the first terminal to view information of the second terminal, a display permission to display the information of the first terminal, or includes a combination of the foregoing two permissions. The method for acquiring another piece of privacy information by the second terminal is similar to the method for acquiring the privacy information by the first terminal. For this scenario, as shown in FIG. 5D, step 506 may include: receiving, by the server, the agreement information including another piece of privacy information and sent by the second terminal.

Accordingly, step 508 may include: controlling, by the server, display content on the social application sharing platform of the first terminal and/or the second terminal according to the privacy information set by the first and second terminals.

The server control the display content on the social application sharing platform of the first terminal or the second terminal, or the social application sharing platforms of both terminals according to both the privacy information and the another piece of privacy information.

Figure 6A:
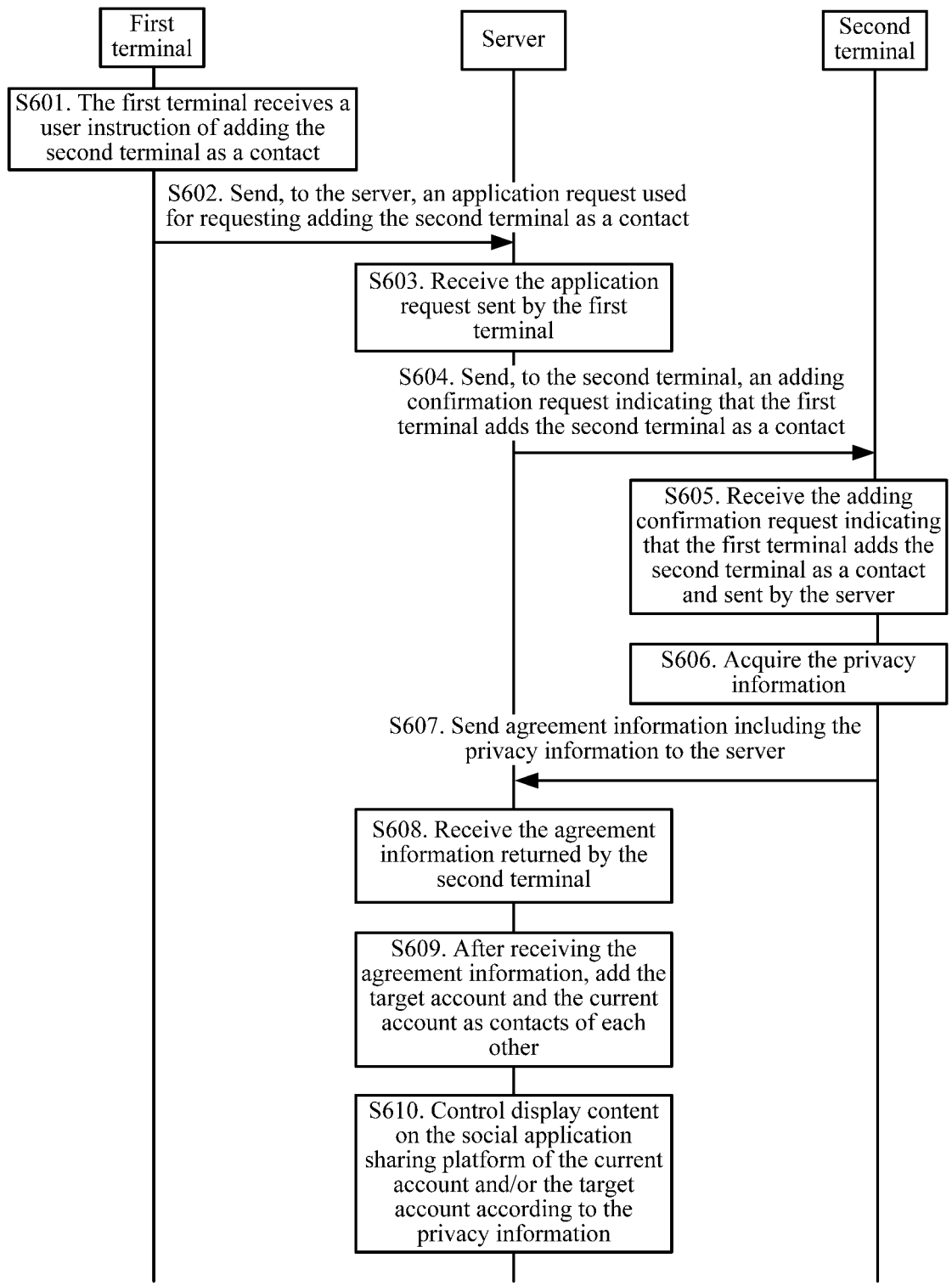
FIG. 6A is a flowchart of a privacy setting method in accordance with some embodiments.

FIG. 6A shows a flowchart of a privacy setting method in accordance with some embodiments. In this method, a current account is an account that a target account requests to be added as a contact, and the target account is an account requesting that the current account be added as a contact. The privacy setting method includes following steps.

Step 601: The first terminal receives a user instruction of adding the second terminal as a contact.

Step 602: The first terminal sends, to a server, a relationship establishment invitation used for requesting that the second terminal be added as a contact.

It should be noted that, after the first terminal receives the user instruction, a user of the first terminal further sets privacy information, and accordingly, the first terminal acquires the privacy information in a process similar to the acquisition method in step 402.

Step 603: The server receives the relationship establishment invitation sent by the first terminal.

Step 604: The server sends, to the second terminal, an adding confirmation request indicating that the first terminal adds the second terminal as a contact.

After receiving the relationship establishment invitation, in order to inform the second terminal that another terminal has a request for being added as a contact, the server send, to the second terminal, the adding confirmation request indicating that the first terminal adds the second terminal as a contact.

Step 605: The second terminal receives the adding confirmation request indicating that the first terminal adds the second terminal as a contact and sent by the server.

Step 606: The second terminal acquires the privacy information.

After receiving the adding confirmation request, the second terminal acquires the privacy information through a process similar to the step 402.

Figure 6B:
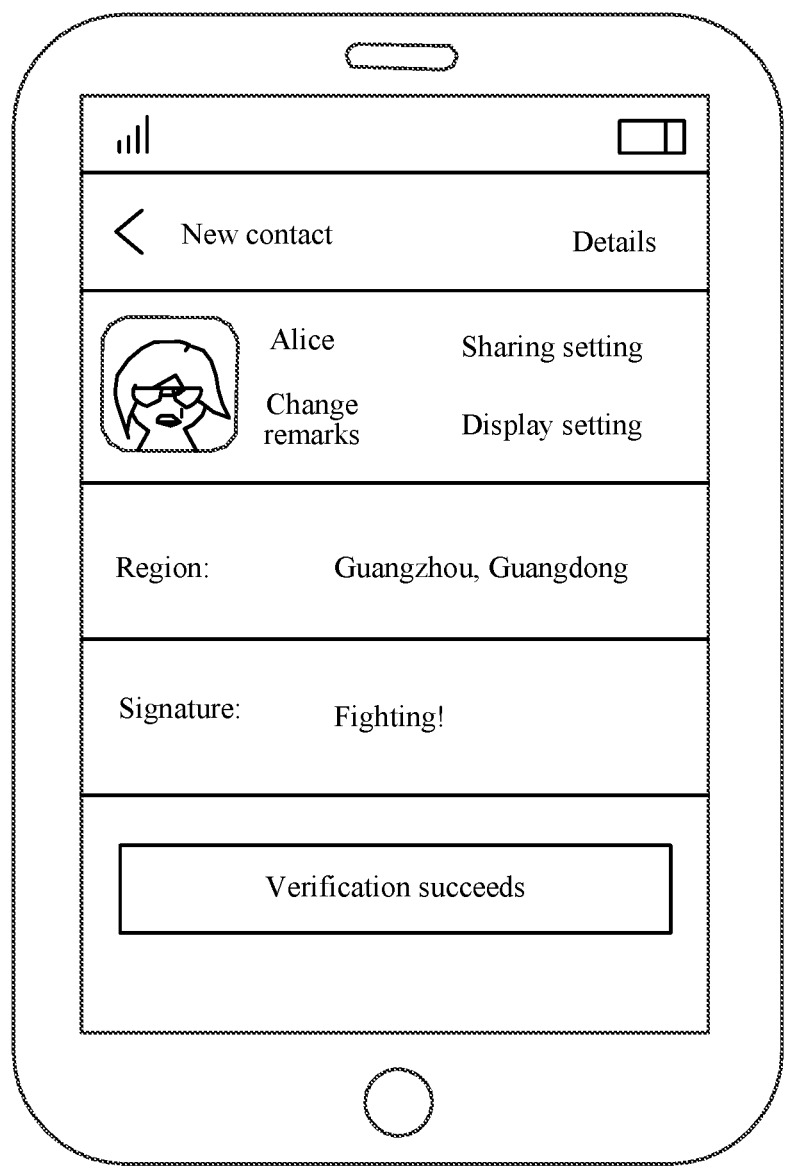
FIG. 6B is a schematic display diagram of a second terminal when a user sets privacy information in accordance with some embodiments.

Specifically, after receiving the adding confirmation request, the second terminal displays a display interface that includes sharing setting options and display setting options, as shown in FIG. 6B.

Step 607: The second terminal sends agreement information including the privacy information to the server.

After acquiring the privacy information, the second terminal sends the agreement information including the privacy information to the server.

Specifically, the user may click the "verification succeeds" button in FIG. 6B, and accordingly, the terminal receives the clicking of the user, and sends the agreement information including the privacy information to the server after receiving the clicking.

Step 608: The server receives the agreement information returned by the second terminal.

Step 609: After receiving the agreement information, the server adds the target account and the current account as contacts of each other.

Step 610: The server controls display content shared by the current account on the sharing platform and/or the target account according to the privacy information.

Figure 7:
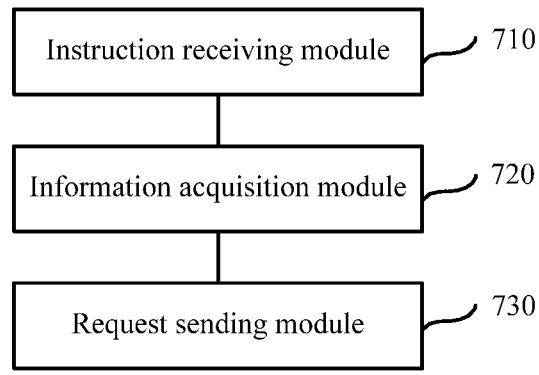
FIG. 7 is a schematic block diagram of a privacy setting apparatus in accordance with some embodiments.

FIG. 7 shows a schematic block diagram of a privacy setting apparatus in accordance with some embodiments. The privacy setting apparatus may include, but is not limited to: an instruction receiving module 710, an information acquisition module 720, and a request sending module 730.

The instruction receiving module 710 is configured to receive a user instruction of establishing a relationship between a current account and a target account.

The information acquisition module 720 is configured to acquire privacy information.

The request sending module 730 is configured to send a relationship establishment invitation including the privacy information to a server.

Figure 8:
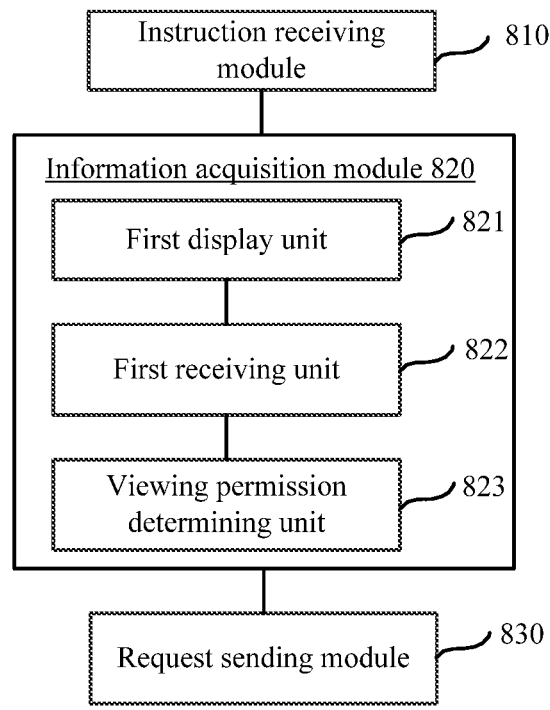
FIG. 8 is a schematic block diagram of a privacy setting apparatus in accordance with some embodiments.

FIG. 8 shows a schematic block diagram of a privacy setting apparatus in accordance with some embodiments. The privacy setting apparatus may include, but is not limited to: an instruction receiving module 810, an information acquisition module 820, and a request sending module 830.

The instruction receiving module 810 is configured to receive a user instruction of establishing a relationship between a current account and a target account.

The information acquisition module 820 is configured to acquire privacy information.

The request sending module 830 is configured to send a relationship establishment invitation including the privacy information to a server.

In some embodiments, the information acquisition module 820 includes: a first display unit 821, configured to display a first interface including sharing options; a first receiving unit 822, configured to receive, on the first interface, a selection of at least one sharing permission from the sharing options; and a sharing permission determining unit 823, configured to use the selected at least one sharing permission as the sharing permission of the target account.

In some embodiments, the instruction receiving module 810 is further configured to receive the user instruction of adding the target account as a contact; and the request sending module 830 is further configured to send a relationship establishment invitation including the privacy information to the server.

In some embodiments, the instruction receiving module 810 is further configured to receive an adding confirmation request sent by the server and indicating that the target account adds the current account as a contact; and the request sending module 830 is further configured to send agreement information including the privacy information to the server.

Figure 9:
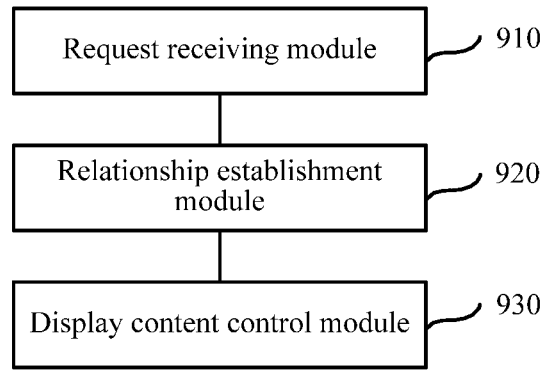
FIG. 9 is a schematic block diagram of a privacy setting apparatus in accordance with some embodiments.

FIG. 9 shows a schematic block diagram of a privacy setting apparatus in accordance with some embodiments. The privacy setting apparatus may include, but is not limited to: a request receiving module 910, a relationship establishment module 920, and a display content control module 930.

The request receiving module 910 is configured to receive a relationship establishment invitation including privacy information and sent by a current account.

The relationship establishment module 920 is configured to establish a relationship between the current account and the target account according to the relationship establishment invitation.

The display content control module 930 is configured to control display content shared by the current account on the sharing platform and/or the target account according to the privacy information.

Figure 10:
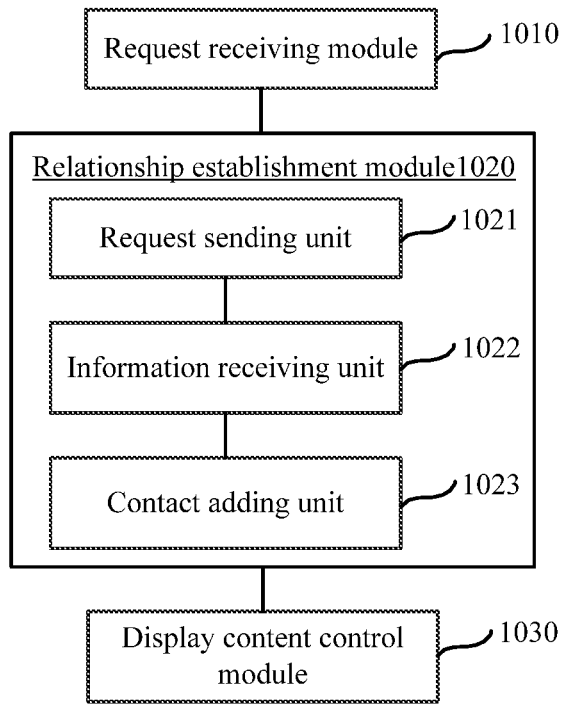
FIG. 10 is a schematic block diagram of a privacy setting apparatus in accordance with some embodiments.

FIG. 10 shows a schematic block diagram of a privacy setting apparatus in accordance with some embodiments. The privacy setting apparatus may include, but is not limited to: a request receiving module 1010, a relationship establishment module 1020, and a display content control module 1030.

The request receiving module 1010 is configured to receive a relationship establishment invitation including privacy information and sent by a current account.

The relationship establishment module 1020 is configured to establish a relationship between the current account and the target account according to the relationship establishment invitation.

The display content control module 1030 is configured to control display content shared by the current account on the sharing platform and/or the target account according to the privacy information.

In accordance with some embodiments, the request receiving module 1010 is further configured to receive a relationship establishment invitation including the privacy information and sent by the current account.

In accordance with some embodiments, the relationship establishment module 1020 includes: a request sending unit 1021, configured to send, to the target account, an adding confirmation request indicating that the current account adds the target account as a contact; an information receiving unit 1022, configured to receive agreement information returned by the target account; and a contact adding unit 1023, configured to add the target account and the current account as contacts of each other.

In accordance with some embodiments, the information receiving unit 1022 is further configured to receive agreement information including another piece of privacy information and returned by the target account; and the display content control module 1030 is further configured to control display content shared by the current account on the sharing platform and/or the target account according to the privacy information and the another piece of privacy information.

In accordance with some embodiments, the request receiving module 1010 is further configured to receive agreement information including the privacy information and sent by the current account; and the relationship establishment module 1020 is further configured to: after the agreement information is received, add the target account and the current account as contacts of each other.

Figure 11:
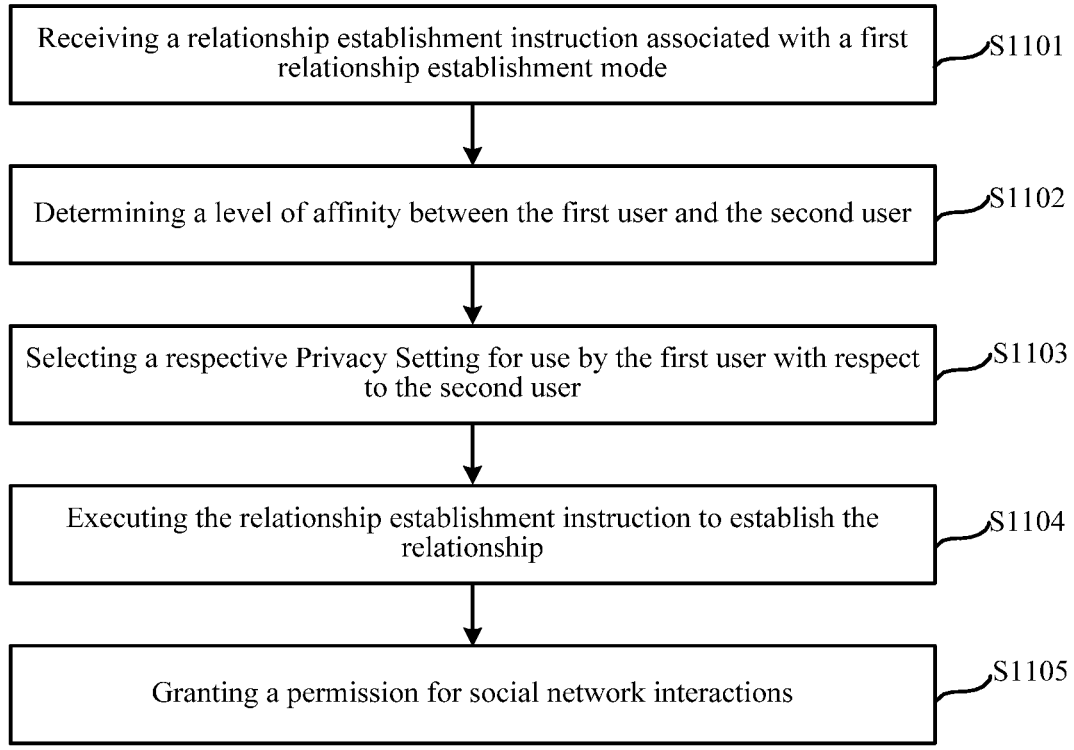
FIG. 11 is a flow chart of a method for configuring privacy settings for a social network application in accordance with some embodiments.

FIG. 11 is a flowchart of a method of configuring privacy settings for a social network application in accordance with some embodiments. In some embodiments, the method is performed at a first user device of having one or more processors and memory for storing one or more programs to be executed by the one or more processors.

In accordance with some embodiments, in a step S1101, the first user device receives a relationship establishment instruction from a first user of the first user device, the relationship establishment instruction being associated with a first relationship establishment mode used by the first user for establishing a relationship between the first user and a second user in a first social network. In some embodiments, the first user device is associated with the current account while the second user device is associated with the target account discussed above.

In accordance with some embodiments, the relationship establishment instruction includes an instruction for accepting an invitation from the second user to establish the relationship between the first user and the second user. In some embodiments, the relationship establishment instruction includes an instruction for sending an invitation to the second user to establish the relationship between the first user and the second user and waiting for an acceptance from the second user.

In accordance with some embodiments, the relationship establishment mode is one of a group consisting of accepting a relationship establishment invitation from the second user, selecting the second user from one or more people found in a proximity search, identifying the second user from a contact list stored at the first user device, identifying the second user based on registered contact information of the second user available to a server of the first social network platform, accepting a recommendation from a mutual contact of the first and second users, scanning a barcode containing contact information, and scanning a name card of the second user.

In some embodiments, a proximity search includes steps of the first user selecting a button of "finding persons nearby." Then a few users within certain proximity will appear in the interface. The first user may choose one of the a few users to send a message or send a relationship establishment invitation.

In some embodiments, the identifying the second user from a contact list stored at the first user device includes that the first user device obtains the contact list and then sends the contact information to the server to find user accounts containing the same contact information. For example, the first user device sends a telephone number of the second user stored in the contact list to the server, and the server returns a social network account of the second user in accordance with the telephone number.

In some embodiments, identifying the second user based on registered contact information of the second user available to a server of the first social network platform, e.g., contact information search, includes that the first user device sends the contact information to the server, including name, address, telephone number, account in a second social network platform, address, and so on. The contact information can be stored in the first user device and is thus obtained by the first user device automatically. Then the server can obtain that information from the first user device and recommend the second user to the first user as a potential social network contact. Alternatively, the first user may enter the contact information and search for the user who matches such contact information.

In some embodiments, accepting a recommendation from a mutual contact of the first and second users includes a contact sending the contact information of the second user to the first user. The contact information may show up as an icon to the first user in a chat window. When the first user clicks it, the first user device automatically sends an invitation to the second user. The second user can accept the invitation by either accepting an invitation from the first user or by clicking the recommendation icon as well.

In some embodiments, scanning a barcode containing contact information includes a second user device either displays a barcode or sends a barcode to another device that displays the barcode. When the first user device scans the barcode, the first user device either sends an invitation to the second user in accordance with the contact information or directly establishes the relationship (the server assuming the second user has agreed to establish a relationship with anyone who is able to scan the barcode).

In some embodiments, scanning a name card of the second user includes that the first user scans the name card of the second user. Then the first user device uses the information in the first name card to obtain a second user account of the second user and sends a relationship establishment invitation to the second user account.

The above examples describe processes of the first user sending relationship establishment invitation or initiate a relationship to the second user. In some embodiments, the relationship establishment mode includes accepting a relationship establishment invitation from the second user. In some embodiments, when receiving a relationship establishment invitation from the second user, the relationship establishment invitation includes information about the relationship establishment mode that the second user uses to send the relationship establishment invitation. In this case, the first user device may use the relationship establishment mode included in the invitation as the basis to determine the privacy setting. For example, when the first user device receives an invitation including a note "found through name card scanning," the first user device determines a level of affinity in accordance with a relationship establishment mode "name card scanning."

In accordance with some embodiments, in a step S1102, in accordance with the first relationship establishment mode, the first user device determines a level of affinity between the first user and the second user corresponding to the first relationship establishment mode.

In accordance with some embodiments, in a step S1103, in accordance with the level of affinity, the first user device selects a privacy setting corresponding to the level of affinity from the plurality of privacy settings as the respective privacy setting for use by the first user with respect to the second user in the first social network.

In accordance with some embodiments, in accordance with the first relationship establishment mode, selecting the respective privacy setting for use by the first user with respect to the second user further comprises: obtaining a privacy setting with respect to the second user in a second social network; and in accordance of the obtained privacy setting in the second social network, determining the privacy setting with respect to the second user in the first social network.

In accordance with some embodiments, the first user device has predetermined corresponding relationships among affinity level, privacy settings and relationship establishment modes. For example, the first user device may include a table below:

| Establishment Mode | Affinity | Sharing setting |
|---|---|---|
| Proximity Search | Far | No sharing |
| Existing Contact (with no group information) | Middle | Sharing part of content |
| Existing Contact (family or close contact) | Close | Sharing all content |
| Existing Contact (Colleague, Classmate or Social contact) | Middle | Sharing part of content |
| Existing Contact (Acquaintance or Strangers) | Far | No sharing |
| Contact Information Search | Far | No sharing |
| Contact Recommendation | Middle | Sharing part of content |
| Barcode Scanning | Far | No sharing |
| Name card scanning | Middle | Sharing part of content |

In accordance with some embodiments, the first user device obtains a respective group to which the second user belongs in a second social network; and determines the respective privacy setting for use by the first user with respect to the second user in the first social network in accordance of the obtained respective group. Note that the mode of existing contact has been divided into different rows. Existing contact refers to a contact from a contact list that is either locally stored or in a server. The contact list can be the phone book, contact list in another social network, email address list in an email, and so on. If the first user has assigned the contacts into different groups, the first user device may use the group assignment information of a contact to find a more accurate affinity level and privacy setting for the contact.

In some embodiments, the user may wish to establish the association between the different modes and the privacy settings. For example, the first user may change the corresponding affinity level to name card scanning from middle to low and the privacy setting from sharing all content to sharing part of the content.

In some embodiments, the privacy settings can be a hierarchy with increasing access privileges (as shown in the table), different combinations of privileges, or both. For example, while colleagues and social contacts are in the same level of affinities, the content being shared can be different. The user may specify that profession related content is shared to colleagues but not social contacts, while religious content is shared to social contacts but not colleagues. And when the first user posts content in the social network, he can specify the category of the content so that the server can selectively determine which content is displayed to which contacts. Therefore, colleagues and social contacts have different combinations of privileges. Meanwhile, family and close contacts are in a closer affinity level and can see all content being shared by the first user.

Figure 12:
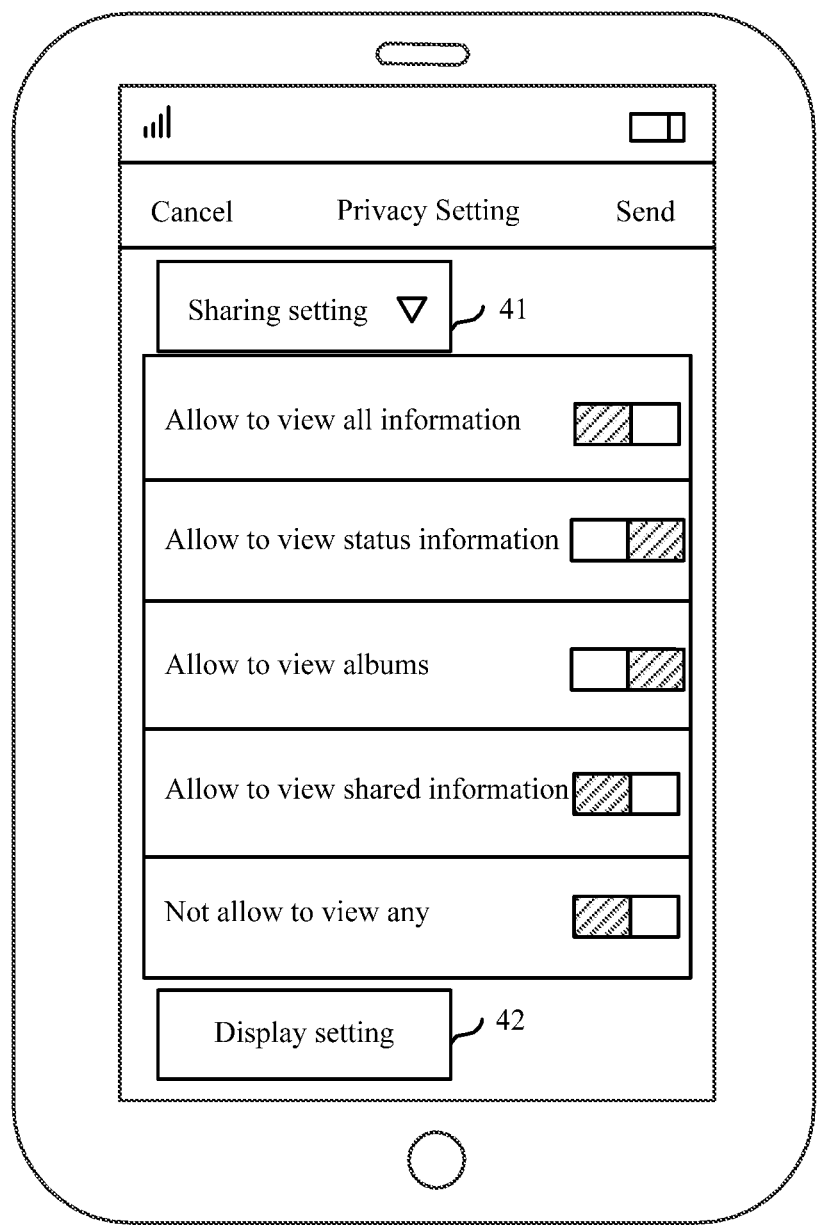
FIG. 12 is a schematic display diagram of a user device in accordance with some embodiments.

In accordance with some embodiments, before executing the relationship establishment instruction, the first user device displays the respective privacy setting to the first user on the first user device, e.g., as shown in FIG. 12. In some embodiments, the first user device changes the respective privacy setting in accordance with the second user instruction in response to a second user instruction for changing the respective privacy setting from the first user. For example, after scanning a barcode, the first user device sets the affinity level to the second user as far. However, since the first user knows the second user quite well, the first user may set the affinity level as middle. For another example, the user may override the automatically generated privacy policies. FIG. 12 illustrates an interface that includes automatic privacy settings by the first user device. In accordance with a relationship establishment mode, the first user device sets that the second user is allowed to view status information and album, but not other shared information. When the first user is quite intimate with the second user, the first user may move the top slider, which corresponds to allowing the second user to see all information of the first user on the sharing platform.

In accordance with some embodiments, in a step S1104, the first user device executes the relationship establishment instruction to establish the relationship between the first user and the second user in the first social network.

In accordance with some embodiments, when the first user device sending a relationship establishment invitation to the second user, the first user has option of letting the relationship establishment invitation to display the respective privacy setting of the first user with respect to the second user along with the relationship establishment invitation. In some other embodiments, privacy settings are hidden from the second user.

In accordance with some embodiments, in a step S1105, after executing the relationship establishment instruction resulting in establishing the relationship between the first user and second user, the first user device grants a permission for social network interactions between the first user and the second user in accordance with the respective privacy setting.

In accordance with some embodiments, granting the permission for social network interactions between the first user the second user in accordance with the respective privacy setting further comprises: sending the granted permission to a server of the first social network platform, the granted permission permitting the server to display to the second user a first predetermined set of photos, postings and messages shared by the first user in the first social network. The set can be all of the things shared by the first user, a particular type of thing shared by the user, shared under a particular category of the social network platform, shared during a particular time window, shared to a particular group, etc.

In accordance with some embodiments, granting the permission for social network interactions between the first user and the second user in accordance with the respective privacy setting further comprises: sending the granted permission to a server of the first social network platform, the granted permission permitting the server to restrict display a first predetermined set of photos, postings and messages that are shared by the first user in the first social network to within a predetermined time window. For example, the first user has a habit of sharing family-related content (photos, postings and messages) only between 7 pm and 11 pm every day. The user may specify that content shared between 7 pm and 11 pm will only be displayed to users with higher affinity level or within a certain group.

In accordance with some embodiments, granting the permission for social network interactions between the first user and the second user in accordance with the respective privacy setting further comprises: sending the granted permission to a server of the first social network platform, the granted permission permitting the server to display to the first user a second predetermined set of photos, postings and messages shared by the second user in the first social network. For example, the permission may include that the first user does not view any postings by the second user except comments by the second user to the postings by the first user.

In accordance with some embodiments, granting the permission for social network interactions between the first user and the second user in accordance with the respective privacy setting further comprises: sending the granted permission to a server of the first social network platform, the granted permission permitting the server to limit a display time window for displaying a second predetermined set of photos, postings and messages shared by the second user to the first user in the first social network. For example, the user does not want to view any postings except those are work related between 9 am and 5 pm every day. The user may set that for people who are not in the colleague and professional friends group, the displaying time window is between 5 pm and 9 am next day.

In accordance with some embodiments, after establishing the relationship between the first user and second user, the first user device receives page information for rendering a listing of newly shared items that the first user is permitted to see on the first social network platform. In some embodiments, the page information includes multiple items shared by the second user on the first social network platform, and in accordance with a count of the multiple items shared by the second user and the respective privacy setting, the first user device consolidates the multiple shared items into a summary item and displays the summary item in lieu of the multiple items in a page that is rendered based on the page information. For example, the second users share 10 postings within a minute and therefore when the first user opens the main page of the social network at the same time, the top 10 postings would be all from the second user. However, the affinity level between the first and second user is far and the first user is probably not quite interested in seeing so many posts from the second user. This feature allows the first user device to consolidate the 10 postings into a single item and therefore saves the space in the page of the first user. If the first user is interested in seeing the details of the 10 postings, he can still click it to expand the consolidated item into 10 postings.

In accordance with some embodiments, after establishing the relationship between the first user and second user, the first user device receives page information for rendering a listing of newly shared items that the first user is permitted to see on the first social network platform. In some embodiments, the page information includes one or more items shared by the second user on the first social network platform. In accordance with a current time and the respective privacy setting, the first user device omitting at least one of the one or more items from a page that is rendered based on the page information. For example, if an item shared by the second user is received at a time outside of a predetermined time window, that item is not displayed.

In accordance with some embodiments, after establishing the relationship between the first user and second user, the first user device detects a change of privacy setting used by the first user with respect to the second user in a second social network. In some embodiments, in accordance of the change of privacy setting in the second social network, the first user device changes the privacy setting for use by the first user with respect to the second user in the first social network. For example, the first user maintains relationships with the second user in both social network A and social network B and classifies the second user in the "golf club" group. When the first user adds the second user to the "close friend" group in the social network B (whether or not through the first user device), the first user device detects the change and automatically prompts the first user whether the first user wants to adds the second user to the "close friend" group as well.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the technology and various embodiments with various modifications as are suited to the particular use contemplated.

What is claimed is:

1. A method of configuring privacy settings for a social network application, comprising:
    at a first user device having one or more processors and memory for storing one or more programs to be executed by the one or more processors:
        receiving a relationship establishment instruction from a first user of the first user device, the relationship establishment instruction being associated with a first relationship establishment mode used by the first user for establishing a relationship between the first user and a second user of a second user device in a social network platform;
        receiving, from the first user, a first respective privacy setting for use by the first user with respect to the second user from a plurality of privacy settings, each of the privacy settings corresponding to one or more respective relationship establishment modes;
        sending the relationship establishment instruction including the first privacy setting to a server of the first social network platform, the relationship establishment instruction configured to instruct the server to (i) send an adding confirmation request to the second user device, (ii) receive agreement information including a second respective privacy setting from the second user device, (iii) grant a first permission to the first user for social network interactions between the first user and the second user in accordance with the second respective privacy setting and a second permission to the second user for social network interactions between the first user and the second user in accordance with the first respective privacy setting that is distinct from the second respective privacy setting, respectively, and (iv) establish a chat session between the first user and the second user in the first social network platform and send a notification of the chat session to the first user device; and
        in response to a receipt of the notification of the chat session, initiating a chat window between the first user and the second user in accordance with the chat session and displaying, in the chat window, a user interface including content shared by the second user according to the second respective privacy setting.

2. The method of claim 1, further comprising:
    in accordance with the first relationship establishment mode, determining a level of affinity between the first user and the second user corresponding to the first relationship establishment mode; and
    in accordance with the level of affinity, selecting a privacy setting corresponding to the level of affinity from the plurality of privacy settings as the first respective privacy setting for use by the first user with respect to the second user in the first social network.

3. The method of claim 1, wherein the relationship establishment mode is one of a group consisting of accepting a relationship establishment invitation from the second user, selecting the second user from one or more people found in a proximity search, identifying the second user from a contact list stored at the first user device, identifying the second user based on registered contact information of the second user available to a server of the first social network platform, accepting a recommendation from a mutual contact of the first and second users, scanning a barcode containing contact information, and scanning a name card of the second user.

4. The method of claim 1, wherein granting the second permission to the second user for social network interactions between the first user and the second user in accordance with the first respective privacy setting further comprises:
    sending the granted second permission to a server of the first social network platform, the granted second permission permitting the server to display to the second user a first predetermined set of photos, postings and messages shared by the first user in the first social network platform.

5. The method of claim 1, wherein granting the second permission to the second user for social network interactions between the first user and the second user in accordance with the first respective privacy setting further comprises:
    sending the granted second permission to a server of the social network platform, the granted second permission permitting the server to restrict display a first predetermined set of photos, postings and messages that are shared by the first user in the social network platform to within a predetermined time window.

6. The method of claim 1, wherein granting the first permission to the first user for social network interactions between the first user and the second user in accordance with the second respective privacy setting further comprises:
    sending the granted first permission to a server of the social network platform, the granted first permission permitting the server to display to the first user a second predetermined set of photos, postings and messages shared by the second user in the social network platform.

7. The method of claim 1, further comprising:
receiving page information for rendering a listing of newly shared items that the first user is permitted to see on the social network platform, wherein the page information includes multiple items shared by the second user on the social network platform;
in accordance with a count of the multiple items shared by the second user and the second respective privacy setting, consolidating the multiple shared items into a summary item; and
displaying the summary item in lieu of the multiple items in a page that is rendered based on the page information.

8. A device of configuring privacy settings for a social network application, comprising:
one or more processors; and
memory storing one or more programs for execution by the one or more processors, the one or more programs including instructions for:
receiving a relationship establishment instruction from a first user of the first user device, the relationship establishment instruction being associated with a first relationship establishment mode used by the first user for establishing a relationship between the first user and a second user of a second user device in a social network platform;
receiving, from the first user, a first respective privacy setting for use by the first user with respect to the second user from a plurality of privacy settings, each of the privacy settings corresponding to one or more respective relationship establishment modes;
sending the relationship establishment instruction including the first privacy setting to a server of the first social network platform, the relationship establishment instruction configured to instruct the server to (i) send an adding confirmation request to the second user device, (ii) receive agreement information including a second respective privacy setting from the second user device, (iii) grant a first permission to the first user for social network interactions between the first user and the second user in accordance with the second respective privacy setting and a second permission to the second user for social network interactions between the first user and the second user in accordance with the first respective privacy setting that is distinct from the second respective privacy setting, respectively, and (iv) establish a chat session between the first user and the second user in the social network platform and send a notification of the chat session to the first user device; and
in response to a receipt of the notification of the chat session, initiating a chat window between the first user and the second user in accordance with the chat session and displaying, in the chat window, a user interface including content shared by the second user according to the second respective privacy setting.

9. The device of claim 8, the one or more programs including instructions for:
in accordance with the first relationship establishment mode, determining a level of affinity between the first user and the second user corresponding to the first relationship establishment mode; and
in accordance with the level of affinity, selecting a privacy setting corresponding to the level of affinity from the plurality of privacy settings as the first respective privacy setting for use by the first user with respect to the second user in the first social network.

10. The device of claim 8, wherein the relationship establishment mode is one of a group consisting of accepting a relationship establishment invitation from the second user, selecting the second user from one or more people found in a proximity search, identifying the second user from a contact list stored at the first user device, identifying the second user based on registered contact information of the second user available to a server of the first social network platform, accepting a recommendation from a mutual contact of the first and second users, scanning a barcode containing contact information, and scanning a name card of the second user.

11. The device of claim 8, wherein granting the second permission to the second user for social network interactions between the first user and the second user in accordance with the first respective privacy setting further comprises:
sending the granted second permission to a server of the social network platform, the granted second permission permitting the server to display to the second user a first predetermined set of photos, postings and messages shared by the first user in the social network platform.

12. The device of claim 8, wherein granting the second permission to the second user for social network interactions between the first user and the second user in accordance with the first respective privacy setting further comprises:
sending the granted second permission to a server of the social network platform, the granted second permission permitting the server to restrict display a first predetermined set of photos, postings and messages that are shared by the first user in the social network platform to within a predetermined time window.

13. The device of claim 8, wherein granting the first permission to the first user for social network interactions between the first user and the second user in accordance with the second respective privacy setting further comprises:
sending the granted first permission to a server of the social network platform, the granted first permission permitting the server to display to the first user a second predetermined set of photos, postings and messages shared by the second user in the social network platform.

14. The device of claim 8, the one or more programs including instructions for:
receiving page information for rendering a listing of newly shared items that the first user is permitted to see on the first social network platform, wherein the page information includes multiple items shared by the second user on the social network platform;
in accordance with a count of the multiple items shared by the second user and the second respective privacy setting, consolidating the multiple shared items into a summary item; and
displaying the summary item in lieu of the multiple items in a page that is rendered based on the page information.

15. A non-transitory computer readable storage medium having instructions stored thereon, the instructions, when executed by one or more processors, cause the processors to perform operations comprising:
receiving a relationship establishment instruction from a first user of the first user device, the relationship establishment instruction being associated with a first relationship establishment mode used by the first user for establishing a relationship between the first user and a second user of a second user device in a social network platform;

receiving, from the first user, a first respective privacy setting for use by the first user with respect to the second user from a plurality of privacy settings, each of the privacy settings corresponding to one or more respective relationship establishment modes;

sending the relationship establishment instruction including the first privacy setting to a server of the first social network platform, the relationship establishment instruction configured to instruct the server to (i) send an adding confirmation request to the second user device, (ii) receive agreement information including a second respective privacy setting from the second user device, (iii) grant a first permission to the first user for social network interactions between the first user and the second user in accordance with the second respective privacy setting and a second permission to the second user for social network interactions between the first user and the second user in accordance with the first respective privacy setting that is distinct from the second respective privacy setting, respectively, and (iv) establish a chat session between the first user and the second user in the social network platform and send a notification of the chat session to the first user device; and in response to a receipt of the notification of the chat session, initiating a chat window between the first user and the second user in accordance with the chat session and displaying, in the chat window, a user interface including content shared by the second user according to the second respective privacy setting.

16. The non-transitory computer readable storage medium of claim 15, further comprising:

in accordance with the first relationship establishment mode, determining a level of affinity between the first user and the second user corresponding to the first relationship establishment mode; and in accordance with the level of affinity, selecting a privacy setting corresponding to the level of affinity from the plurality of privacy settings as the first respective privacy setting for use by the first user with respect to the second user in the first social network.

17. The non-transitory computer readable storage medium of claim 15, wherein the relationship establishment mode is one of a group consisting of accepting a relationship establishment invitation from the second user, selecting the second user from one or more people found in a proximity search, identifying the second user from a contact list stored at the first user device, identifying the second user based on registered contact information of the second user available to a server of the first social network platform, accepting a recommendation from a mutual contact of the first and second users, scanning a barcode containing contact information, and scanning a name card of the second user.

18. The non-transitory computer readable storage medium of claim 15, wherein granting the second permission to the second user for social network interactions between the first user and the second user in accordance with the first respective privacy setting further comprises:

sending the granted second permission to a server of the social network platform, the granted second permission permitting the server to display to the second user a first predetermined set of photos, postings and messages shared by the first user in the social network platform.

19. The non-transitory computer readable storage medium of claim 15, wherein granting the second permission to the second user for social network interactions between the first user and the second user in accordance with the first respective privacy setting further comprises:

sending the granted second permission to a server of the social network platform, the granted second permission permitting the server to restrict display a first predetermined set of photos, postings and messages that are shared by the first user in the social network platform to within a predetermined time window.

20. The non-transitory computer readable storage medium of claim 15, wherein granting the first permission to the first user for social network interactions between the first user and the second user in accordance with the second respective privacy setting further comprises:

sending the granted first permission to a server of the social network platform, the granted first permission permitting the server to display to the first user a second predetermined set of photos, postings and messages shared by the second user in the social network platform.

* * * * *